United States Patent
Sultenfuss et al.

(10) Patent No.: US 9,887,571 B1
(45) Date of Patent: Feb. 6, 2018

(54) COMBINING POWER FROM AN INTERNAL BATTERY AND AN EXTERNAL POWER STORAGE ADAPTER

(71) Applicant: Dell Products L.P., Round Rock, TX (US)

(72) Inventors: Andrew Thomas Sultenfuss, Leander, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/631,467

(22) Filed: Jun. 23, 2017

(51) Int. Cl.
*H02J 7/00* (2006.01)

(52) U.S. Cl.
CPC ..... *H02J 7/0068* (2013.01); *H02J 2007/0098* (2013.01)

(58) Field of Classification Search
CPC ........... H02J 7/0068; H02J 2007/0098; H02M 2001/007; B60L 11/1866; B60L 11/1861; B60L 3/0046
USPC ............... 320/103, 104, 128, 132, 137, 138; 307/43–46, 48, 64–66, 80–81, 85, 86
See application file for complete search history.

(56) References Cited

U.S. PATENT DOCUMENTS 9,197,092 B2 11/2015 Verdun et al.
9,263,912 B2 2/2016 Verdun et al.
9,524,018 B2 12/2016 Sultenfuss et al.
2007/0079153 A1* 4/2007 Bain ........................ G06F 1/263
  713/300
2016/0274607 A1* 9/2016 Kudo ........................ H02J 3/32

OTHER PUBLICATIONS

Universal Serial Bus, "USB Power Delivery." Retrieved from <http://www.usb.org/developers/powerdelivery/> on Jun. 28, 2017; 3 pages.
SMBus, "System Management Bus (SMBus)." Retrieved from <www.smbus.org> on Jun. 28, 2017; 2 pages.
UEFI, "Unified Extensible Firmware Interface (UEFI) Specification" Retrieved from <http://uefi.org>, May 2017; 2899 pages.
Wikipedia, "USB." Retrieved from <https://en.wikipedia.org/wiki/USB> on Mar. 19, 2017; 35 pages.

* cited by examiner

*Primary Examiner* — Adolf Berhane
*Assistant Examiner* — Afework Demisse
(74) *Attorney, Agent, or Firm* — Baker Botts L.L.P.

(57) ABSTRACT

An embedded controller of a portable information handling system may cause electrical power supplied by an external power storage adapter (PSA) and electrical power supplied by an internal battery of the portable information handling system to be combined in order to supply enough electrical power for the information handling system to operate in a particular operating mode. The external power storage adapter may include an AC-DC converter, a separate PSA battery, and intelligent power management functionality. In response to a control signal or other indication from the portable information handling system that the power storage adapter should supply electrical power to the portable information handling system, the power storage adapter may output power sourced from the AC-DC converter, from the PSA battery, or both to a port of the portable information handling system, such as USB Type-C port, over a variable power bus.

20 Claims, 7 Drawing Sheets

500 — METHOD FOR COMBINING POWER FROM AN INTERNAL BATTERY
AND AN EXTERNAL POWER STORAGE ADAPTER

502 — DETERMINE A FIRST POWER LEVEL AT WHICH ELECTRICAL POWER IS TO BE CONSUMED BY AN INFORMATION HANDLING SYSTEM WHEN OPERATING IN A FIRST OPERATING MODE OF A PLURALITY OF OPERATING MODES, EACH OPERATING MODE HAVING RESPECTIVE PERFORMANCE OR POWER CONSUMPTION CHARACTERISTICS

504 — DETERMINE THAT NEITHER AN INTERNAL BATTERY OF THE INFORMATION HANDLING SYSTEM NOR A POWER STORAGE ADAPTER, COMPRISING A BATTERY AND AN AC-DC CONVERTER, TO WHICH THE INFORMATION HANDLING SYSTEM IS COUPLED OVER A VARIABLE POWER BUS, INDIVIDUALLY, HAS CAPACITY TO SUPPLY POWER AT THE FIRST POWER LEVEL

506 — DETERMINE A FIRST DESIRED OUTPUT VOLTAGE FOR THE INTERNAL BATTERY AND A SECOND DESIRED OUTPUT VOLTAGE FOR THE POWER STORAGE ADAPTER DEPENDENT ON THE FIRST OPERATING MODE

508 — PROVIDE AN INDICATION OF THE FIRST DESIRED OUTPUT VOLTAGE TO AN INTERNAL BATTERY MANAGEMENT UNIT, THE BATTERY MANAGEMENT UNIT COMPRISING AN ADJUSTABLE DC-DC VOLTAGE CONVERTER TO ADJUST AN OUTPUT VOLTAGE OF THE INTERNAL BATTERY TO A DESIRED OUTPUT VOLTAGE

510 — PROVIDE AN INDICATION OF THE SECOND DESIRED OUTPUT VOLTAGE TO THE POWER STORAGE ADAPTER OVER A COMMUNICATION LINK BETWEEN THE INFORMATION HANDLING SYSTEM AND THE POWER STORAGE ADAPTER

512 — CAUSE ELECTRICAL POWER SUPPLIED BY THE POWER STORAGE ADAPTER OVER THE VARIABLE POWER BUS AT THE SECOND DESIRED OUTPUT VOLTAGE AND ELECTRICAL POWER SUPPLIED BY THE INTERNAL BATTERY AT THE FIRST DESIRED OUTPUT VOLTAGE TO BE SUPPLIED SIMULTANEOUSLY TO THE INFORMATION HANDLING SYSTEM, THE SUM OF THE ELECTRICAL POWER SUPPLIED BY THE POWER STORAGE ADAPTER AND THE ELECTRICAL POWER SUPPLIED BY THE INTERNAL BATTERY BEING GREATER THAN OR EQUAL TO THE FIRST POWER LEVEL

FIG. 5

COMBINING POWER FROM AN INTERNAL BATTERY AND AN EXTERNAL POWER STORAGE ADAPTER

BACKGROUND

Field of the Disclosure

This disclosure relates generally to information handling systems and, more particularly, to systems and methods for combining power from an internal battery of an information handling system and an external power storage adapter.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a disclosed system is for combining power from an internal battery and an external power storage adapter. In at least some embodiments, the system may include a variable power bus including power connections for electrically coupling components to each other and a communication link for exchanging information between electrically coupled components, and a power storage adapter (PSA), and an information handling system. The power storage adapter may include a PSA battery, an AC-DC converter, and a PSA port for coupling the power storage adapter to the variable power bus. The information handling system may include an internal battery, a battery management unit comprising a DC-DC voltage converter to adjust an output voltage of the internal battery to a desired output voltage, an internal port for coupling the information handling system to the power storage adapter over the variable power bus, and an embedded controller. The embedded controller may include circuitry to, when the information handling system is coupled to the power storage adapter over the variable power bus through the internal port, determine a first power level at which electrical power is to be consumed by the information handling system when operating in a first operating mode of a plurality of operating modes, each operating mode having respective performance or power consumption characteristics, determine that neither the internal battery nor the power storage adapter, individually, has capacity to supply electrical power at the first power level, determine a first desired output voltage for the internal battery and a second desired output voltage for the power storage adapter dependent on the first operating mode, provide an indication of the first desired output voltage to the battery management unit, provide an indication of the second desired output voltage to the power storage adapter over the communication link, and cause electrical power supplied by the power storage adapter over the variable power bus at the second desired output voltage and electrical power supplied by the internal battery at the first desired output voltage to be supplied simultaneously to the information handling system. The sum of the electrical power supplied by the power storage adapter and the electrical power supplied by the internal battery is greater than or equal to the first power level.

In any of the disclosed embodiments, to cause electrical power supplied by the power storage adapter over the variable power bus at the second desired output voltage and electrical power supplied by the internal battery at the first desired output voltage to be supplied simultaneously to the information handling system, the embedded controller circuitry may further be to provide an indication to the battery management unit to combine the electrical power supplied by the power storage adapter over the variable power bus at the second desired output voltage and the electrical power supplied by the internal battery at the first desired output voltage, and the battery management unit may include circuitry to combine the electrical power supplied by the power storage adapter over the variable power bus at the second desired output voltage and the electrical power supplied by the internal battery at the first desired output voltage.

In any of the disclosed embodiments, the embedded controller circuitry may further be to determine a second power level at which electrical power is to be consumed by the information handling system when operating in a second operating mode of the plurality of operating modes subsequent to operating in the first operating mode, to determine that the internal battery or the power storage adapter, individually, has capacity to supply electrical power at the second power level, and to cause either electrical power supplied by the power storage adapter over the variable power bus alone or electrical power supplied by the internal battery alone to be supplied to the information handling system when operating in the second operating mode.

In any of the disclosed embodiments, when the power storage adapter is not coupled to AC line power, the electrical power supplied by the power storage adapter may be sourced from the PSA battery.

In any of the disclosed embodiments, when the power storage adapter is coupled to AC line power, the electrical power supplied by the power storage adapter may be sourced from the AC-DC converter.

In any of the disclosed embodiments, when the power storage adapter is coupled to AC line power, the electrical power supplied by the power storage adapter may include power sourced from the PSA battery and power sourced from the AC-DC converter.

In any of the disclosed embodiments, the DC-DC voltage converter may include circuitry to boost an initial output voltage of the internal battery to the first desired output voltage.

In any of the disclosed embodiments, the power storage adapter may further include a PSA controller. The PSA controller may utilize a universal serial bus (USB) power delivery protocol layer for communicating with and supplying power to the information handling system over the variable power bus through the PSA port and the internal port, the PSA port and the internal port may be USB Type-C ports, and the PSA controller circuitry may further be to establish a power delivery contract to supply electrical power to the information handling system at the second desired voltage, and to configure the power storage adapter to supply electrical power to the information handling system over the variable power bus at the second desired output voltage.

In any of the disclosed embodiments, the embedded controller circuitry may include a processor, and a memory storing program instructions that when executed by the processor cause the processor to perform the determining of the first power level, the determining that neither the internal battery nor the power storage adapter, individually, has capacity to supply electrical power at the first power level, the determining of the first desired output voltage and the second desired output voltage, the providing of the indication of the first desired output voltage to the battery management unit, the providing of the indication of the second desired output voltage to the power storage adapter over the communication link, and the causing of the electrical power supplied by the power storage adapter and the electrical power supplied by the internal battery to be supplied simultaneously to the information handling system.

In another aspect, a disclosed method is for combining power from an internal battery and an external power storage adapter. In at least some embodiments, the method may include determining a first power level at which electrical power is to be consumed by the information handling system when operating in a first operating mode of a plurality of operating modes, each operating mode having respective performance or power consumption characteristics, determining that neither an internal battery of the information handling system nor a power storage adapter (PSA), comprising a PSA battery and an AC-DC converter, to which the information handling system is coupled over a variable power bus, individually, has capacity to supply electrical power at the first power level, determining a first desired output voltage for the internal battery and a second desired output voltage for the power storage adapter dependent on the first operating mode, providing an indication of the first desired output voltage to a battery management unit comprising a DC-DC voltage converter for adjusting an output voltage of the internal battery to a desired output voltage, providing an indication of the second desired output voltage to the power storage adapter over a communication link between the information handling system and the power storage adapter, and causing electrical power supplied by the power storage adapter over the variable power bus at the second desired output voltage and electrical power supplied by the internal battery at the first desired output voltage to be supplied simultaneously to the information handling system, wherein the sum of the electrical power supplied by the power storage adapter and the electrical power supplied by the internal battery is greater than or equal to the first power level.

In any of the disclosed embodiments, causing electrical power supplied by the power storage adapter over the variable power bus at the second desired output voltage and electrical power supplied by the internal battery at the first desired output voltage to be supplied simultaneously to the information handling system may include providing an indication to the battery management unit to combine the electrical power supplied by the power storage adapter over the variable power bus at the second desired output voltage and the electrical power supplied by the internal battery at the first desired output voltage, and the method may further include the battery management unit combining the electrical power supplied by the power storage adapter over the variable power bus at the second desired output voltage and the electrical power supplied by the internal battery at the first desired output voltage.

In any of the disclosed embodiments, the method may further include determining a second power level at which electrical power is to be consumed by the information handling system when operating in a second operating mode of the plurality of operating modes subsequent to operating in the first operating mode, determining that the internal battery or the power storage adapter, individually, has capacity to supply electrical power at the second power level, and causing either electrical power supplied by the power storage adapter over the variable power bus alone or electrical power supplied by the internal battery alone to be supplied to the information handling system when operating in the second operating mode In any of the disclosed embodiments, when the power storage adapter is not coupled to AC line power, the electrical power supplied by the power storage adapter may be sourced from the PSA battery.

In any of the disclosed embodiments, when the power storage adapter is coupled to AC line power, the electrical power supplied by the power storage adapter may be sourced from the AC-DC converter, or from both the PSA battery and the AC-DC converter.

In any of the disclosed embodiments, the method may further include the DC-DC voltage converter boosting an initial output voltage of the internal battery to the first desired output voltage.

In any of the disclosed embodiments, the method may further include determining that the information handling system is operating in the first operating mode. Determining that the information handling system is operating in the first operating mode may include monitoring a power draw of the information handling system, receiving an indication of a request to enter the first operating mode, or receiving a request for power to be supplied at the first power level.

In a further aspect, a disclosed information handling system includes an internal battery, a battery management unit comprising a DC-DC voltage converter to adjust an output voltage of the internal battery to a desired output voltage, an internal port for coupling the information handling system to a power storage adapter (PSA) over a variable power bus. The variable power bus may include power connections for electrically coupling components to each other and a communication link for exchanging information between electrically coupled components. The power storage adapter may include a PSA battery and an AC-DC converter to supply electrical power to the information handling system over the variable power bus. The information handling system may also include an embedded controller. The embedded controller may include circuitry to, when the information handling system is coupled to the power storage adapter over the variable power bus through the internal port, determine a first power level at which electrical power is to be consumed by the information handling system when operating in a first operating mode of a plurality of operating modes, each operating mode having respective performance or power consumption characteristics, determine that neither the internal battery nor the power storage adapter, individually, has capacity to supply electrical power at the first power level, determine a first desired output voltage for the internal battery and a second desired output voltage for the power storage adapter dependent on the first operating mode, provide an indication of the first desired output voltage to the battery management unit, provide an indication of the second desired output voltage to the power storage adapter over the communication link, and cause electrical power supplied by the power storage adapter over the variable power bus at the second desired output voltage and electrical power supplied by the internal battery at the first desired output voltage to be supplied simultaneously to the information handling system, wherein the sum of the electrical power supplied by the power storage adapter and the electrical power supplied by the internal battery is greater than or equal to the first power level.

In any of the disclosed embodiments, to cause electrical power supplied by the power storage adapter over the variable power bus at the second desired output voltage and electrical power supplied by the internal battery at the first desired output voltage to be supplied simultaneously to the information handling system, the embedded controller circuitry may be further to provide an indication to the battery management unit to combine the electrical power supplied by the power storage adapter over the variable power bus at the second desired output voltage and the electrical power supplied by the internal battery at the first desired output voltage, and the battery management unit may further include circuitry to combine the electrical power supplied by the power storage adapter over the variable power bus at the second desired output voltage and the electrical power supplied by the internal battery at the first desired output voltage.

In any of the disclosed embodiments, the embedded controller circuitry may further be to determine a second power level at which electrical power is to be consumed by the information handling system when operating in a second operating mode of the plurality of operating modes subsequent to operating in the first operating mode, to determine that the internal battery or the power storage adapter, individually, has capacity to supply electrical power at the second power level, and to cause either electrical power supplied by the power storage adapter over the variable power bus alone or electrical power supplied by the internal battery alone to be supplied to the information handling system when operating in the second operating mode.

In any of the disclosed embodiments, the DC-DC voltage converter may include circuitry to boost an initial output voltage of the internal battery to the first desired output voltage.

BRIEF DESCRIPTION OF THE DRAWINGS

For a more complete understanding of the present disclosure and its features and advantages, reference is now made to the following description, taken in conjunction with the accompanying drawings, in which:

FIG. 5 is a flow chart of selected elements of an embodiment of a method for combining power from an internal battery and an external power storage adapter.

DESCRIPTION OF PARTICULAR EMBODIMENT(S)

Figure 1:
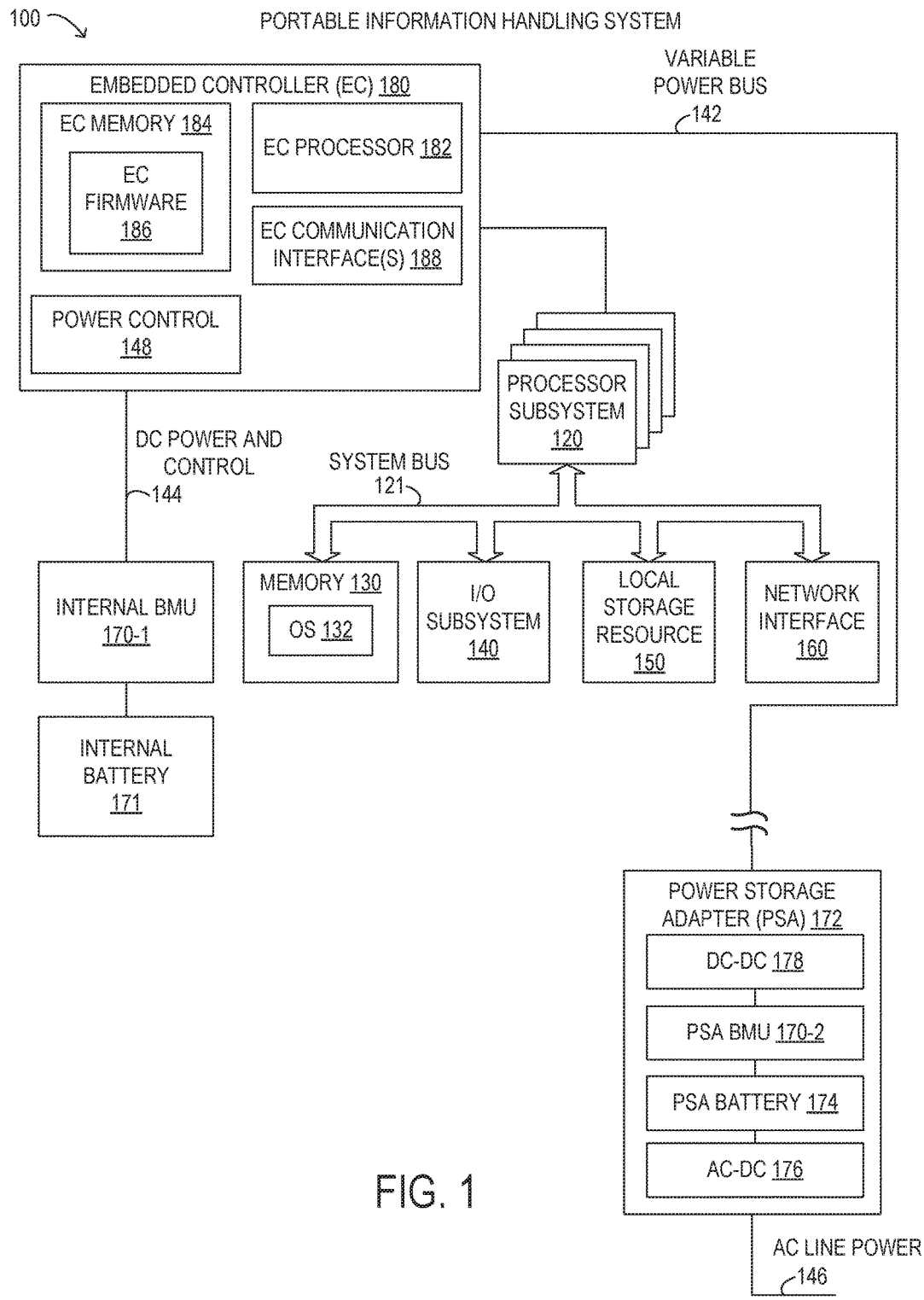
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the unhyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3A, 3B, 4, 5, and 6 wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170-1 that manages an internal battery 171. Furthermore, information handling system 100 is shown removably coupled to a power storage adapter 172 that incorporates various high efficiency features for use with portable information handling system 100, as disclosed herein. As shown, power storage adapter 172 may be an external device to portable information handling system 100 and may be coupled to portable information handling system 100 using a variable power bus 142, for example, using an appropriate connector, as described in further detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Also shown in FIG. 1 is embedded controller (EC) 180, which may include EC processor 182 as a second processor included within portable information handling system 100 for certain management tasks, including supporting communication and providing various functionality with respect to internal BMU 170-1. Thus, EC processor 182 may have access to EC memory 184, which may store EC firmware 186, representing instructions executable by EC processor 182.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

Also shown within embedded controller 180 is power control 148, which may be responsible for managing electrical power connections between power storage adapter 172, internal BMU 170-1, and to portable information handling system 100. In some embodiments, power control 148 may be implemented as a separate controller external to embedded controller 180. For example, when variable power bus 142 supplies electrical power to portable information handling system 100, power control 148 may determine whether the electrical power is used to charge internal battery 171 or to directly power portable information handling system 100. Power control 148 may also manage so-called 'soft start up' of portable information handling system 100, such as when portable information handling system 100 awakes from a low power state, such as sleep mode, by determining a source of power during the low power state and managing operation of portable information handling system 100 during the low power state. Power control 148 may accordingly route electrical power and communicate with internal BMU 170-1 via DC power and control 144, which may represent suitable connections between embedded controller 180 and internal BMU 170-1, for example. It is noted that in some embodiments, at least certain portions of power control 148 may be implemented using EC firmware 186, such as specialized executable instructions for power management and control.

In particular embodiments, embedded controller 180 may support a variable power bus 142, which may represent a data bus that also carries and distributes electrical power to and from portable information handling system 100. In various embodiments, variable power bus 142 supports different levels of direct-current (DC) power that may be provided to certain peripherals connected to I/O subsystem 140. In particular embodiments, variable power bus 142 may be used to receive DC power from an external source, such as a power storage adapter 172. For example, the DC power received from the external source may be routed via DC power connection 144 to internal BMU 170-1 for purposes of charging internal battery 171 or otherwise powering portable information handling system 100.

In certain embodiments, variable power bus 142 is implemented according to an industry standard, such as a Universal Serial Bus (USB), which is developed and supported by the USB Implementers Forum, Inc. (USB IF, www.usb.org). In particular, variable power bus 142 may be implemented as a USB Type-C bus that may support different USB devices, such as USB Type-C devices with USB Type-C connectors. Accordingly, variable power bus 142 may support device detection, interface configuration, communication, and power delivery mechanisms according to the USB Type-C standard. The USB Type-C connector system allows the transport of data and electrical power (in the form of DC power) between various USB devices that are connected using USB Type-C ports and USB Type-C connectors. A USB device may be an information handling system, a peripheral device, a power device, among other types of USB devices, and may support more than one USB standard or generation, such as USB 1.0, USB 2.0, USB 3.0, USB 3.1, or other versions. Furthermore, USB devices may also support one or more types of physical USB ports and corresponding connectors (i.e., receptacles and plugs), such as Type-A, Type-A SuperSpeed, Type-B, Type-B SuperSpeed, Mini-A, Mini-B, Micro-A, Micro-B, Micro-B SuperSpeed, and Type-C (also referred to as USB Type-C herein), among other variants. In one example, USB 3.1 Type-C cables may provide electronic functionality using an integrated semiconductor device with an identification function based on a configuration data channel and vendor-defined messages (VDMs) from a USB Power Delivery specification published by USB IF (http://www.usb.org/developers/powerdelivery/). Examples of source power rules governed by the USB Power Delivery Specification, revision 2.0, version 1.2 are given in Table 1 below.

TABLE 1

USB Power Delivery revision 2.0, version 1.2 source power rules.

| Source Output Power [W] | Current [A] at +5 V DC | Current [A] at +9 V DC | Current [A] at +15 V DC | Current [A] at +20 V DC |
|---|---|---|---|---|
| 0.5 to 15 | 0.1 to 3.0 | none | none | none |
| 15 to 27 | 3.0 (15 W limit) | 1.7 to 3.0 | none | none |
| 27 to 45 | 3.0 (15 W limit) | 3.0 (27 W limit) | 1.8 to 3.0 | none |
| 45 to 60 | 3.0 (15 W limit) | 3.0 (27 W limit) | 3.0 (45 W limit) | 2.25 to 3.0 |
| 60 to 100 | 3.0 (15 W limit) | 3.0 (27 W limit) | 3.0 (45 W limit) | 3.0 to 5.0 |

As shown in Table 1, USB Power Delivery defines four standardized voltage levels (+5V DC, +9V DC, +15V DC, and +20V DC), while power supplies may provide electrical power from 0.5 W to 100 W.

A USB device, such as a USB Type-C device, may provide multiple power ports that can individually transfer power in either direction and may accordingly be able to operate as a power source device, a power sink device, or both (dual-role power device). A USB device operating as a dual-role power device may operate as a power source or a power sink depending on what kinds of other USB devices are connected. In addition, each of the multiple power ports provided by the USB device may be a dual-role power port that is able to operate as either a power source port or a power sink port. For example, a USB Type-C bus, such as variable power bus 142, may support power delivery from a power source port of a power source USB device to a power sink port of a power sink USB device, while simultaneously supporting bidirectional USB data transport. The power source port of the power source USB device and the power sink port of the power sink USB device form a power port pair. Each of the other power ports provided by the USB device may form other power port pairs of other USB dual-role power devices.

According to the USB Power Delivery Specification, USB Type-C devices may perform a negotiation process to negotiate and establish a power contract for a particular power port pair that specifies a level of DC power that is transferred using USB. For example, a USB Type-C device may negotiate a power contract with another USB device for a level of DC power that is supported by a power port pair of both devices, where one power port is a power source port of the USB Type-C device and the other power port is a power sink port of the other USB device. The power contract for power delivery and consumption may represent an agreement reached between the power source device and the power sink device for the power port pair. While operating in Power Delivery mode, the power contract for the power port pair will generally remain in effect unless altered by a re-negotiation process, a USB soft reset, a USB hard reset, a removal of power by a power source, a failure of the power source, or a USB role swap (such as between power source and power sink devices), as specified in detail by USB IF. When a particular power contract is in place, additional power contracts can be established between another power port of the power source device and a power port of another power sink device.

According to the USB Power Delivery specification, the negotiation process may begin with the power source device detecting an attachment of a USB device operating as a power sink to a power port of the power source device. In response to the detection of the attachment at the respective USB ports, the power source device may communicate a set of supported capabilities including power levels, voltage levels, current levels, and direction of power flow of the power port of the power source device by sending the set of supported capabilities to the power sink over the USB connection. In response to receiving the set of supported capabilities, the power sink device may request one of the communicated capabilities by sending a request message to the power source device. In response to receiving the request message, the power source device may accept the request by sending an accept message and by establishing a power source output corresponding to the request. The power contract for the power port pair may be considered established and in effect when the power source device sends the accept message to the power sink device, which ends the negotiation process. A re-negotiation process may occur in a similar manner when a power contract is already in effect.

During the negotiation process, a power sink USB device that may be unable to fully operate at any of the communicated capabilities may request a default capability but indicate that the power sink USB device would prefer another power level. In response to receiving the default capability request, the power source device may accept the default capability request by storing the power sink USB device's preferred power level, sending an accept message, and by establishing a power source output corresponding to the default capability request.

During the various negotiation processes described above for USB Power Delivery, the negotiation may fail when a request is not accepted, and may result in no power contract being established. For example, the power sink USB device and the power source USB device may have timeouts for pending requests, or other communications, to a respective counterparty. When a counterparty does not respond within the timeout, a pending request or other communication may fail. It is also noted that in some embodiments, a power delivery contract for zero electrical power may be established, such that no power is transferred but the power port pair remains connected over the USB connection.

As illustrated in FIG. 1, each of portable information handling system 100 and power storage adapter 172 may include a battery management unit (BMU) 170 that controls operation of a respective battery. In particular implementations, BMU 170 may be embedded within a respective battery whose operation BMU 170 controls. For example, internal BMU 170-1 within portable information handling system 100 may control operation of an internal battery 171, while PSA BMU 170-2 within power storage adapter 172 may control operation of a PSA battery 174. More specifically, BMU 170-1 may monitor information associated with, and control charging operations of, internal battery 171, while BMU 170-2 may monitor information associated with, and control charging operations of, PSA battery 174. In operation, each BMU 170 may control operation of a respective battery to enable sustained operation, such as by protecting the battery. Protection of the battery by BMU 170 may comprise preventing the battery from operating outside of safe operating conditions, which may be defined in terms of certain allowable voltage and current ranges over which the battery can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In some embodiments, a battery (such as internal battery 171 or PSA battery 174 illustrated in FIG. 1) may be considered to be discharged when an SOC of the battery corresponds to an SOC that is below a predetermined threshold percentage or amount below the 100% charge level given by the TOC voltage, such as below a 5% charge level in one example. A battery may be considered to be charged, i.e., at least partially charged, when the SOC for the battery corresponds to an SOC that is above a first predetermined threshold percentage or amount below the 100% charge level given by the TOC voltage, such as above the 25% charge level in one example. A battery may be considered to be fully charged when the SOC of the battery corresponds to an SOC that is above a second predetermined threshold percentage or amount below the 100% charge level given by the TOC voltage, such as above the 95% charge level for example. A battery may be considered to be at least partially discharged when the SOC of the battery corresponds to an SOC that is below the 100% charge level.

The parameters for specifying an SOC described above are examples and may be modified using different values in different embodiments.

In various embodiments, a battery (such as internal battery 171 or PSA battery 174 illustrated in FIG. 1) may include one or more cells having a particular chemistry in a particular cell configuration. For example, in one embodiment, the battery may include four Lithium-ion cells in a two parallel-two serial (2S-2P) configuration. In other embodiments, the battery may include a different number of cells or may include multiple cells in a different configuration. For example, the battery may include three or more cells in various configurations. In some embodiments, the battery may include one or more cells based on any one of a variety of Lithium-ion electrochemistries, or one or more cells based a different electrochemistry than Lithium-ion.

As shown in FIG. 1, power storage adapter 172 may be designed to removably couple to portable information handling system 100 using variable power bus 142. For example, variable power bus 142 may include power connections for electrically coupling power storage adapter 172 to portable information handling system 100 as an external load on power storage adapter 172. Variable power bus 142 may also include a communication link to enable power storage adapter 172 to communicate with portable information handling system 100, such as via embedded controller 180. For example, power storage adapter 172 may communicate battery data collected locally at power storage adapter 172 to portable information handling system 100 over a communication link within variable power bus 142. In other embodiments, there may be a communication link between power storage adapter 172 and portable information handling system 100 that is separate from variable power bus 142 instead of, or in addition to, a communication link that is part of variable power bus 142. In some embodiments, a communication link between power storage adapter 172 and portable information handling system 100, or DC power and control 144, may operate in accordance with a System Management Bus (SMBus) protocol for sending and receiving data. As noted above, in particular embodiments, variable power bus 142 is compatible with USB Type-C and may be implemented according to USB Type-C and USB Power Delivery specifications promulgated by USB IF.

In various embodiments, each of internal battery 171 or PSA battery 174 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. The temperature sensor may be located in proximity to the battery cells to provide an accurate indication of a temperature within the battery. The fuse may be a safety element for limiting current flowing through the main power circuit. The power switch may be an electronically controlled switching element that closes or opens the main power circuit, and thereby allows the battery to operate for charging or discharging.

In FIG. 1, each BMU 170 may include a charging unit (see FIG. 2, charging unit 246) that may control charging cycles for a battery and may apply a TOC voltage as a threshold to determine when charging is complete as the battery voltage increases during charging. The TOC voltage may be lower than or equal to the maximum charge voltage that the battery can physically sustain, in different embodiments. Depending on the actual value for the TOC voltage, a given energy capacity may be stored using the battery. BMU 170 may also be enabled to obtain various types of information associated with a battery and to make decisions according to the obtained information. For example, each BMU 170 may monitor various charging-related parameters or other operating parameters received from one or more batteries, including parameters received from a local battery or parameters received from a remote battery over variable power bus 142.

In some embodiments, parameters monitored by a BMU 170 may include a charging current, a voltage, and a temperature associated with a battery. More specifically, the parameters monitored by the BMU 170 may include any or all of the cell configuration and chemistry of battery cells within the battery, the total voltage of the battery, the voltages of individual battery cells, minimum or maximum cell voltages, the average temperature of the battery as a whole, the temperatures of individual battery cells, the SOC of the battery, the depth of discharge of the battery, the current flowing into the battery, the current flowing out of the battery, and any other measurement of the overall condition of the battery, in various embodiments. In some embodiments, monitoring the SOC may include continuous or periodic monitoring of battery output current, voltage, or both. In some cases, Coulomb counting, in which the charge delivered or stored by a battery is tracked, is used for battery monitoring. In some embodiments, a battery temperature may be monitored through the use of periodic voltage measurements, a thermometer, or any other method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to another device, such as information associated with PSA battery 174 that is provided to or obtained by PSA BMU 170-2 on power storage adapter 172, and which may be provided to portable information handling system 100 over variable power bus 142.

In some embodiments, BMU 170 may calculate additional values, based on the monitored battery parameters or other information obtained from a battery, for example, in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, and an operating time since the last charge. In some embodiments, BMU 170, or another component of portable information handling system 100 or power storage adapter 172, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof. In some embodiments, information indicating an alert condition for PSA battery 174 that is detected by PSA BMU 170-2 on power storage adapter 172 may be provided to portable information handling system 100 over variable power bus 142.

In various embodiments, BMU 170 may further include a DC boost converter (see FIG. 2, DC boost converter 248) that is capable of boosting the voltage provided by the cells within a battery. The DC boost converter may be externally controlled to provide a desired boost voltage output from the battery, such as in response to a control signal or other trigger condition. Because the internal output voltage of the battery may be constrained by the particular battery electrochemistry used to implement the cells, the DC boost converter may enable the battery to output a higher voltage, as desired. In some embodiments, the DC boost converter may be a buck-boost type converter that can step up or step down an input DC voltage.

In some embodiments, embedded controller 180 may implement a voltage control module that senses the current drawn by an electrical load and provides a control signal to BMU 170-1 based on the current drawn by the electrical load. For example, the voltage control module may be implemented as executable code stored by EC memory 184, while the electrical load may be information handling system 100, or portions thereof. It may be advantageous, for example, to provide a higher voltage to the electrical load in order to minimize the power dissipated by losses incurred in transmitting current from internal battery 171 to the electrical load. In another embodiment, the voltage control module may provide control signals in response to a voltage set signal. The voltage set signal may instruct the voltage control module to control BMU 170-1 to produce a particular voltage at the load. For example, the particular voltage level may allow the load to operate in a desired mode of operation. In one embodiment, the particular voltage level indicated by the voltage set signal may be higher than the voltage output by cells within a battery. BMU 170-1 may boost the voltage output by the cells to the voltage indicated by the voltage set signal.

For example, in some embodiments, a battery (such as internal battery 171 or PSA battery 174 illustrated in FIG. 1) may provide electrical power to the information handling system 100 at an output voltage controlled by its respective BMU 170. In some cases, portable information handling system 100 may provide load state information to the voltage control module. In some embodiments, the load state information may be based on the operating mode of the load, or on a desired future operating mode of the load. The voltage control module may determine a voltage level based on the load state information, and may provide voltage control information based on the determined voltage level to internal BMU 170-1 or PSA BMU 170-2. In one embodiment, voltage control information provided to PSA BMU 170-2 may specify the output voltage level of power storage adapter 172. In another embodiment, voltage control information provided to PSA BMU 170-2 may indicate a preferred voltage range for the output voltage level of power storage adapter 172. In yet another embodiment, voltage control information provided to PSA BMU 170-2 may indicate that the output voltage level of power storage adapter 172 should be increased or should be decreased.

In certain embodiments, BMU 170 may include a processor and memory (not shown). The memory may store instructions executable by the processor to perform one or more of the methods described herein for obtaining and calculating values related to the operation and charging of a battery and for controlling the operation and charging of the battery. The memory may also store data, obtained and calculated values, thresholds, and parameters related to the methods described herein.

Figure 2:
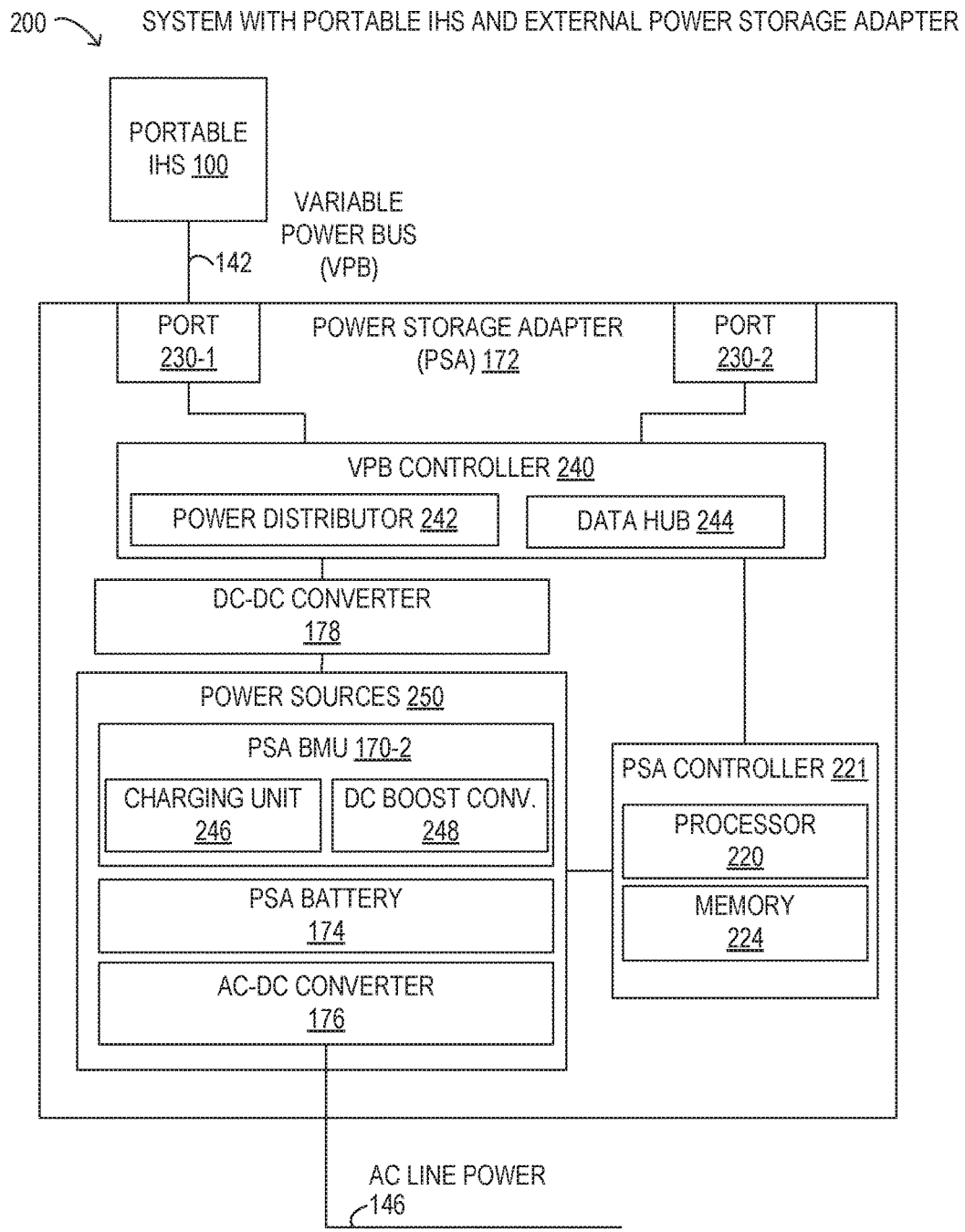
FIG. 2 is a block diagram of selected elements of an embodiment of a portable information handling system with an external power storage adapter.

In FIG. 1, power storage adapter 172 is shown receiving AC line power 146 as an external power source. AC line power 146 may represent a connection to line power, such as using a standard line power cable. In some embodiments, AC line power 146 may be a removable connection, such as a cable that plugs into line power in a wall socket, and plugs into a corresponding receptacle included with power storage adapter 172. Also included within power storage adapter 172 in FIG. 2 is AC-DC converter 176. AC-DC converter 176 may receive alternating current (AC) from AC line power 146 and may output one or more DC voltages for supplying electrical power to other components in power storage adapter 172. For example, an output DC voltage from AC-DC converter 176 may be supplied to PSA battery 174 for charging purposes. An output DC voltage from AC-DC converter 176 may be supplied to a DC-DC converter 178, which may then generate one or more other DC voltages. Also, an output DC voltage from AC-DC converter 176 may be directly supplied to variable power bus 142, such as to fulfil a power contract, as described above. Additional details of power storage adapter 172 are described below with respect to FIG. 2 and FIGS. 3A and 3B.

As will be described in further detail herein, power storage adapter 172 may include a high efficiency architecture for power distribution. Specifically, power storage adapter 172 may include a 20V_AC bar that is used to directly supply electrical power externally via ports 230, as well as supplying electrical power for internal purposes. In this manner, power storage adapter 172 may eliminate a voltage regulator for a 20V output voltage, thereby reducing losses from the potential use of the 20V voltage regulator. Furthermore, the 20V_AC bar may supply electrical power to a DC boost converter that can boost an output of a PSA battery to provide 20V boost current that can be used to augment the output power supplied by power storage adapter 172 from an AC line power source. A charging unit may be used to boost a charging voltage of the PSA battery in order to more efficiently charge the PSA battery. In some configurations, a battery voltage $V_{BAT}$ may be used to directly supply electrical power via ports 230. The battery voltage $V_{BAT}$ may generally be in the range of 5V-20V, and may have other ranges in different embodiments, such as a range of 10V-20V, 5V-15V, 12V-20V, or 12V-16.8V in particular embodiments. Various features and advantages of the high efficiency architecture for power storage adapter 172 are described in further detail herein.

Referring now to FIG. 2, selected elements of an embodiment of a system 200 with portable information handling system 100 and power storage adapter 172 are shown. FIG. 2 illustrates further internal details of power storage adapter 172. It is noted that FIG. 2 is not drawn to scale but is a schematic illustration. In various embodiments, power storage adapter 172 may be implemented using fewer or additional components than illustrated in FIG. 2.

In FIG. 2, power storage adapter 172 is coupled to portable information handling system 100 via variable power bus (VPB) 142, as described above with respect to FIG. 1. Additionally, power storage adapter 172 is also externally connected to AC line power 146, as described above with respect to FIG. 1.

As shown in FIG. 2, power storage adapter 172 includes power sources 250, a DC-DC converter 178, a VPB controller 240, and two ports 230, as well as a PSA controller 221 comprising processor 220 and memory 224. As shown, power sources 250 comprise an AC-DC converter 176, a PSA battery 174, and a PSA BMU 170-2. In FIG. 2, PSA BMU 170-2 is shown including a charging unit 246 and a DC boost converter 248, while VPB controller 240 is shown including a power distributor 242 and a data hub 244. In some embodiments, DC boost converter 248 may include buck-boost DC conversion functionality to step up or step down an input DC voltage. VBP controller 240 is depicted in FIG. 2 in an implementation with two ports 230-1 and 230-2 that support variable power bus 142. As noted above, variable power bus 142 may be compatible with USB Type-C specifications promulgated by USB IF. Accordingly, in particular embodiments, port 230-1 may be a USB Type-C port. In different embodiments, port 230-1 may also be a USB Type-C port or another type of port, such as a USB Type-A port, among others. Although two ports 230 are shown in the example embodiment of FIG. 2, it will be understood that power storage adapter 172 may include fewer or more ports 230 in different embodiments.

As shown in FIG. 2, power storage adapter 172 includes PSA controller 221, which may perform various actions and functions. In some embodiments, PSA controller 221 is implemented using a custom integrated circuit, or a customizable integrated circuit, such as a field programmable gate array (FPGA). In the embodiment shown in FIG. 2, PSA controller 221 includes processor 220 and memory 224, which may store executable instructions (such as executable code) that may be executed by processor 220, which has access to memory 224. Processor 220 is typically implemented as an integrated circuit, such as a microprocessor or microcontroller, and is enabled to execute instructions that cause power storage adapter 172 to perform the functions and operations described herein. For the purposes of this disclosure, memory 224 may include non-transitory computer-readable media that stores data and instructions for at least a period of time. Memory 224 may comprise persistent and volatile media, fixed and removable media, and magnetic and semiconductor media. Memory 224 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM) or flash memory, non-transitory media, or various combinations of the foregoing. Memory 224 is operable to store instructions, data, or both. Memory 224 may store sets or sequences of instructions that may represent executable computer programs for implementing various functionality provided by power storage adapter 172.

The functionality and implementation details of certain elements in power storage adapter 172, such as AC-DC converter 176, PSA battery 174, PSA BMU 170-2, and DC-DC converter 178, are described above with respect to FIG. 1.

As shown, VPB controller 240 may include power distributor 242, which may represent various electronic components that enable distribution of DC power with respect to variable power bus 142 via ports 230. Specifically, power distributor 242 may receive at least one DC power input from DC-DC converter 178. Power distributor 242 may route or switch power connections to respective ports 230, for example, to enable fulfillment of a power contract, as described above. A power contract established by VPB controller 240, such as according to a USB Power Delivery Specification, may govern the supply of DC power to portable information handling system 100 via port 230-1. VPB controller 240 may also establish another power contract to supply DC power to another device coupled to port 230-2. In some embodiments, VPB controller 240 supplies DC power to both port 230-1 and port 230-2. Power distributor 242 may supply different DC voltages for output power at different ports 230. In particular embodiments, power distributor 242 supplies a different DC voltage to port 230-1 than to port 230-2.

In FIG. 2, data hub 244 may represent electronic functionality to manage various VPB connections over variable power bus 142. Specifically, data hub 244 may control operation of power distributor 242 and may, in turn, be controlled by PSA controller 221, such as by executable code (not shown) stored in memory 224 and executed by processor 220. Additionally, data hub 244 may store state information for each respective port 230, such as USB state information. For example, data hub 244 may store information associated with power contracts that power storage adapter 172 has established or is in the process of negotiating. Accordingly, data hub 244 may store various information about different VPB devices connected to power storage adapter 172 via ports 230. As used herein, the phrase "power consuming device" may refer to any system, apparatus, or device that is designed and/or configured to consume the electrical power provided by a battery when such power is available and/or under certain conditions. For example, a portable information handling system may consume power for components such as one or more displays, processors, storage media, memory, or other components. A battery providing electrical power to a power consuming device may be internal or external to the power consuming device, in different embodiments and/or at different times.

In the illustrated embodiment, charging unit 246 of BMU 170-2 may draw electrical power from AC-DC converter 176, and may, in turn output a charging voltage and charging current suitable to charge the cells of PSA battery 174. The charging voltage and the charging current demands of the battery may be dependent on an electrochemistry or a cell configuration of the battery cells. The charging of the battery may be limited by the current supply capability of the DC source. In some embodiments, the DC source may be AC-DC converter 176. Once the battery reaches 100% state of charge, BMU 170-2 may stop drawing current from the AC-DC converter 176. When a boost source of power is desired, charging unit 246 may also be enabled to supply electrical from PSA battery 174, which is then boosted to a desired output voltage by DC boost converter 248 (see also FIGS. 3A and 3B).

In some embodiments, portable information handling system 100 may communicate with power storage adapter 172 to instruct PSA BMU 170-2 to charge the battery cells of PSA battery 174. As previously noted, PSA BMU 170-2 may send information to portable information handling system 100, such as the cell configuration, the state of charge of the battery, or other information. Portable information handling system 100 may communicate with PSA BMU 170-2 using a system management bus (not shown), for example System Management Bus (SMBus) promulgated by SBS Implementers Forum (www.smbus.org), in some embodiments.

Figure 3A:
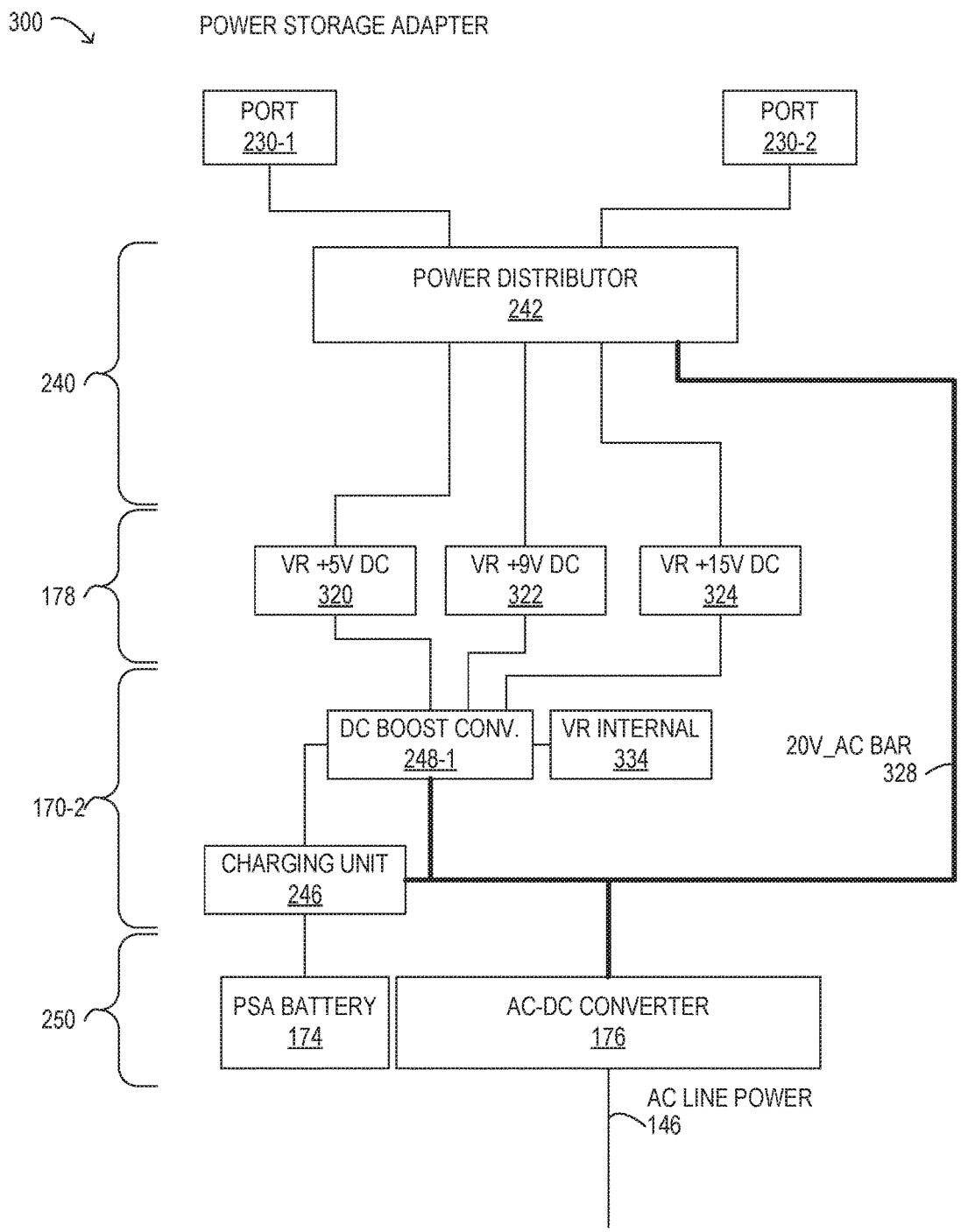
FIGS. 3A and 3B are a block diagrams of selected elements of embodiments of a power storage adapter.

Referring now to FIG. 3A, a power storage adapter 300 is illustrated in particular detail. Specifically, power storage adapter 300 is an embodiment of power storage adapter 172 shown in FIGS. 1 and 2 with particular elements and components illustrated. It is noted that FIG. 3A is not drawn to scale but is a schematic illustration. In various embodiments, power storage adapter 300 may be implemented using fewer or additional components than illustrated in FIG. 3A.

In FIG. 3A, AC-DC converter 176 receives AC line power 146 as a source of electrical energy. Among other functionality, AC-DC converter 176 may generate a regulated 20V output to a 20V_AC bar 328 that distributes the 20V to various different components included in power storage adapter 300. For example, AC-DC converter 176 may directly output regulated 20V via 20V_AC bar 328 to power distributor 242, which is shown included in VPB controller 240. As shown, power distributor 242 may be enabled to distribute electrical power to ports 230-1 and 230-2, which may be USB ports in particular embodiments. For example, power distributor 242 may include a cross connect switch, such as a matrix switch, among other elements, to distribute various power inputs to ports 230. In particular, power distributor 242 may implement OR functionality to provide a particular voltage output to one of ports 230-1 and 230-2, but not both ports 230. Because power delivery at ports 230 to a portable information handling system or another power consuming device may be governed by USB power delivery specifications, power storage adapter 300 may be implemented to limit supply of a particular voltage to a single one of ports 230 by refusing a request for a second supply of electrical power at the same voltage as is already being supplied to one of ports 230.

Although the OR functionality with respect to ports 230 may limit the possible power supply configurations of power storage adapter 300, in practice, because the power delivery capacity of power storage adapter 300 is finite, typical usage scenarios with portable information handling systems and other power consuming devices may rarely be constrained in actual practice for users of power storage adapter 300. For example, port 230-1 may be a USB Type-C port used to power a primary portable information handling system by a user, such as a Dell laptop computer or another brand of laptop computer. Then, the user may connect another power consuming device, such as a secondary portable information handling system that is a cellular telephone associated with the user, to port 230-2, which may be a USB Type-C or a USB Type-A port. Because the secondary portable information handling system may consume less electrical power than the primary information handling system, the secondary portable information handling system may negotiate and establish a USB power delivery contract for a lower power, and hence, at a lower voltage (see also Table 1) than the primary portable information handling system. Furthermore, because the primary portable information handling system may easily consume more than half of the electrical power supplied by power storage adapter 300, power storage adapter 300 may be constrained from simultaneously supplying two primary portable information handling systems because of the rated electrical power capability of power storage adapter 300.

As a result of the OR functionality with respect to ports 230 and 20V_AC bar 328, power storage adapter 300 may be implemented with fewer voltage regulators than other typical implementations or designs, such as other conventional USB Type-C power sources. As shown in FIG. 3A, power storage adapter 300 may implement three voltage regulators in DC-DC converter 178, corresponding to supply voltages specified by USB Type-C. Specifically, power storage adapter 300 may include a voltage regulator (VR) +5V DC 320, a VR +9V DC 322, and a VR +15V DC 324, each of which may be used for regulating an output voltage at either port 230-1 or 230-2. In conventional designs, each output port 230 is typically equipped with a set of VRs that are dedicated to the port. Because VRs have a power inefficiency of about 8-10%, the reduction in the number of VRs used in power storage adapter 300 may be a significant contribution to high efficiency operation. Accordingly, a DC boost converter 248-1 (included with PSA BMU 170-2) may provide a 5V output to VR +5V DC 320, a 9V output to VR +9V DC 322, and a 15V output to VR +15V DC 324. Power distributor 242 may then selectively route the electrical power to individual ones of output ports 230. It is noted that ports 230 may be different types of ports, such as different types of USB ports. For example, port 230-1 may be a USB Type-C port, while port 230-2 may be a USB Type-A port.

Also in FIG. 3A, charging unit 246 may charge PSA battery 174 according to a charging curve (see also FIG. 4) and may receive 20V_AC bar 328 as a voltage source of power. As shown in further detail with respect to FIG. 4, charging unit 246 may be enabled to use a boost charging voltage that incrementally boosts a charging voltage of PSA battery 174. The use of the boost charging voltage by charging unit 246 may occur, in certain embodiments, when both ports 230 are disconnected and are not used for supplying power from power storage adapter 300. Additionally, charging unit 246 may supply electrical power from PSA battery 174 to DC boost converter 248-1, for example, when AC line power 146 is not connected and PSA battery 174 has a sufficient state of charge to supply electrical power. Also shown in a VR internal 334, which may be used by DC boost converter 248-1 for internal purposes.

Figure 3B:
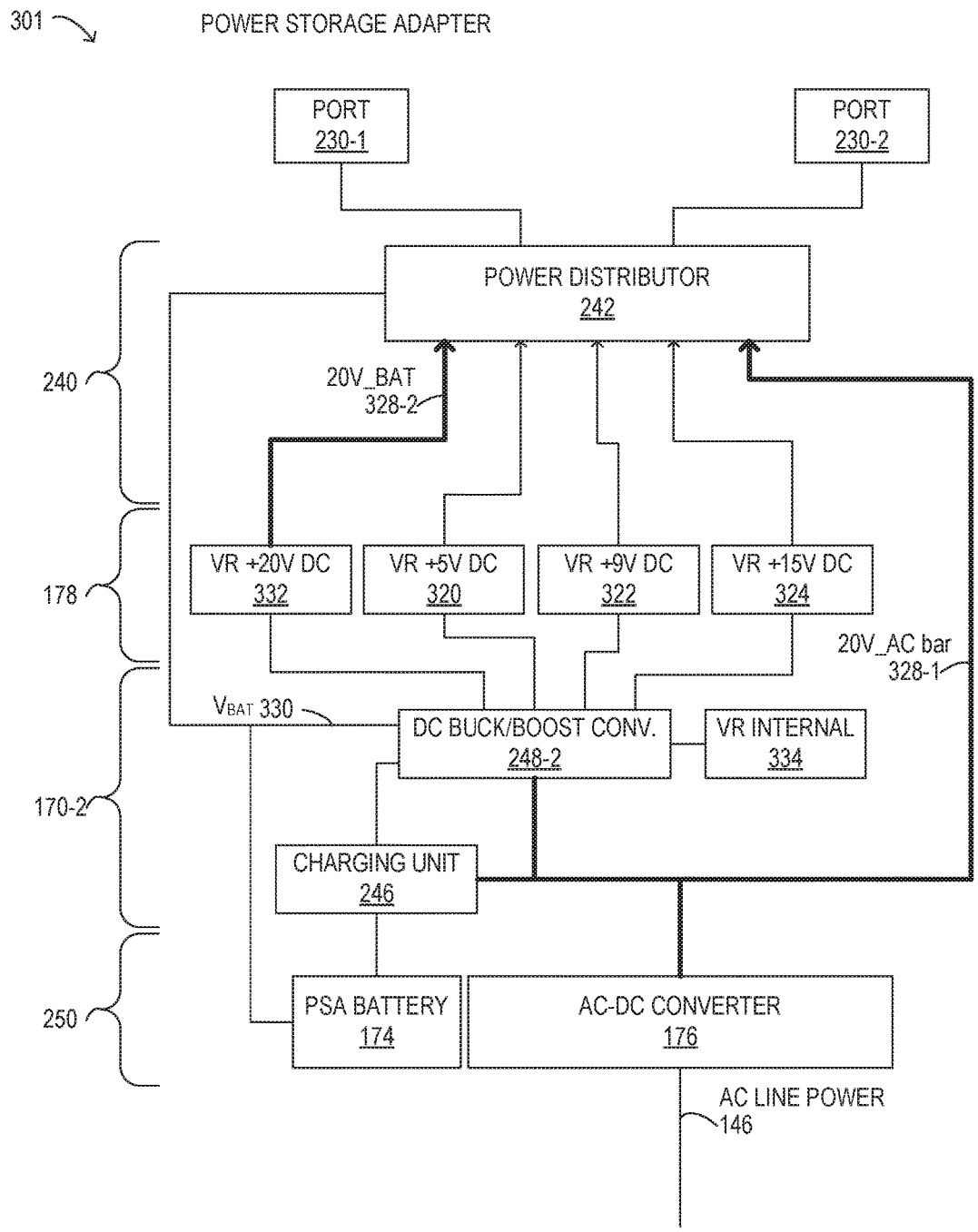

Referring now to FIG. 3B, a power storage adapter 301 is illustrated in particular detail. Specifically, power storage adapter 301 is an embodiment of power storage adapter 172 shown in FIGS. 1 and 2 with particular elements and components illustrated. It is noted that FIG. 3B is not drawn to scale but is a schematic illustration. In various embodiments, power storage adapter 301 may be implemented using fewer or additional components than illustrated in FIG. 3B.

In FIG. 3B, power storage adapter 301 is similar to power storage adapter 300 described above with respect to FIG. 3A and may operate as described above for power storage adapter 300. In FIG. 3B, power storage adapter 301 additionally shows a battery voltage $V_{BAT}$ 330 that is output directly from PSA battery 174 to a DC buck/boost converter 248-2.

When AC line power 146 is not connected, $V_{BAT}$ may be used from DC buck/boost converter 248-2 to generate a 20V_BAT voltage 328-2 using a VR +20V DC 332 for distribution by power distributor 242.

When AC line power 146 is connected, power distributor 242 may receive both 20V_AC bar 328-1 and 20V_BAT voltage 328-2 as a secondary source of boost electrical power, and may combine both sources of 20V electrical power to supply a boosted amount of electrical power. The boosted amount of electrical power supplied in this manner may exceed a nominal power rating for AC-DC converter 176, for example. While 20V_AC bar 328-1 supplies electrical power that is sourced from AC power line 146, the boost electrical power (20V_BAT 328-2) may be added to 20V_AC bar 328-1 as long as PSA battery 174 has sufficient SOC and AC line power 146 is connected and providing electrical power.

Additionally, power distributor 242 may also directly receive $V_{BAT}$ 330 from PSA battery 174, for example, when a different supply voltage than shown in Table 1 are supplied to one or more of PSA ports 230. For example, when portable information handling system 100 connected to PSA port 230-1 is enabled to receive $V_{BAT}$ 330 as a supply voltage, PSA adapter 301 may directly supply $V_{BAT}$ 330 as a source of electrical power. In this manner, electrical power supplied by PSA battery 174 may be output at a voltage that is more efficient for operation of PSA battery 174 (as compared to the fixed voltages in Table 1), which may be desirable for power efficient operation of power storage adapter 301, and of PSA battery 174. In particular, the direct supply of $V_{BAT}$ 330 at one of PSA ports 230 may occur when AC line power 146 is not connected and PSA battery 174 is the source of electrical power supplied by power storage adapter 301.

Figure 4:
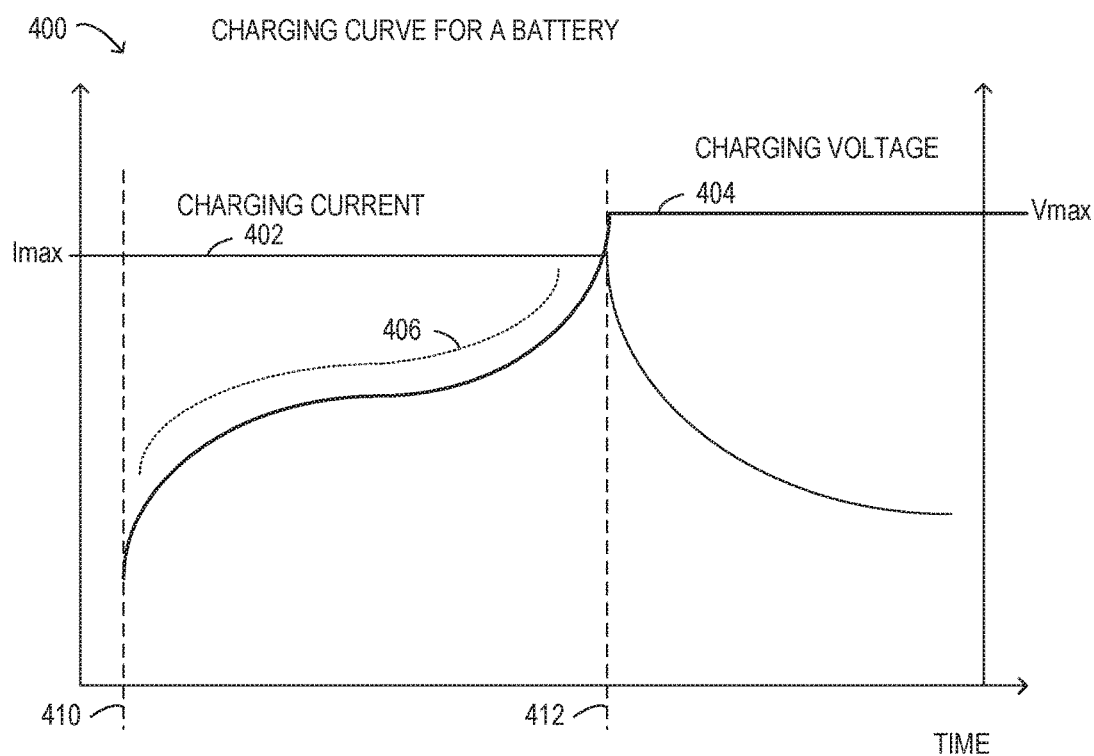
FIG. 4 is a plot showing selected elements of a charging curve for an information handling system battery.

FIG. 4 illustrates a charging curve 400 for a battery, such as internal battery 171 or PSA battery 174. Charging curve 400 is schematically illustrated and is not drawn to scale or perspective. Charging curve 400 may be implemented by BMU 170, for example, using charging unit 246 (see FIG. 2). Charging curve 400 depicts how a charging current 402 and a charging voltage 404 respond over time to various conditions. Specifically, at time 410, it is assumed that the battery is discharged and is charged by supplying charging current 402 that is constant, given by Imax, which is a maximum charging current. In the constant current charging regime between time 410 and time 412, charging voltage 404 may increase from a low value to a higher value as the SOC for the battery increases. At time 412, charging voltage 404 may approach a maximum value, given by Vmax, and may remain constant after time 412. At about time 412, meanwhile, charging current 402 may begin to decrease as the SOC for the battery increases at a lower rate. After time 412, in a constant voltage charging regime, charging current 402 may taper off until at some point, the SOC approaches a maximum value, and no further charging occurs.

Also shown in FIG. 4 is a boost charging voltage 406. Specifically, charging unit 246 may apply boost charging voltage 406 to improve a charging efficiency, for example, by reducing an amount of electrical power consumed during charging, as compared with supplying constant charging voltage Vmax.

Referring now to FIG. 5, a flow chart of selected elements of an embodiment of method 500 for combining power from an internal battery and an external power storage adapter, as described herein, is depicted in flowchart form. Method 500 may be performed using portable information handling system 100, in conjunction with power storage adapter 172 (see FIGS. 1, 2, and 3). In at least some embodiments, method 500 may be performed by EC firmware 186 of embedded controller 180 executing on EC processor 182. In other embodiments, method 500 may be performed by another element of a portable information handling system, such as a hardware state machine or another type of hardware control circuit. It is noted that certain operations described in method 500 may be optional or may be performed in a different order than the order depicted in FIG. 5, in different embodiments.

Method 500 may begin, at step 502, by determining a first power level at which electrical power is to be consumed by an information handling system when operating in a first operating mode of a plurality of operating modes supported in the information handling system. Each operating mode may have respective performance or power consumption characteristics that are different from each other. For example, the information handling system may consume more power when operating in a high performance operating mode than when operating in other lower performance operating modes. In another example, the information handling system may consume more power when operating in a particular operating mode in order to perform certain tasks, such as charging an internal battery of the information handling system. In some embodiments, determining that the information handling system is operating in the first operating mode may include monitoring a power draw of the information handling system, receiving an indication of a request to enter the first operating mode, or receiving a request for power to be supplied at the first power level.

Method 500 may include, at step 504, determining that neither an internal battery of the information handling system nor an external power storage adapter that includes a PSA battery and an AC-DC converter and to which the information handling system is coupled over a variable power bus, individually, has enough power supply capacity to supply power to the information handling system at the first power level. In response to this determination, method 500 may include, at step 506, determining a first desired output voltage for the internal battery and a second desired output voltage for the power storage adapter, where the first and second desired output voltages are dependent on the first operating mode.

Method 500 may also include, at step 508, providing an indication of the first desired output voltage to an internal battery management unit of the information handling system. In at least some embodiments, the battery management unit may include an adjustable DC-DC voltage converter to adjust an output voltage of the internal battery to a desired output voltage. For example, in order to supply electrical power to the information handling system at the first desired output voltage, circuitry within the DC-DC voltage converter may boost an initial output voltage of the internal battery to the first desired output voltage.

At step 510, method 500 may include providing an indication of the second desired output voltage to the power storage adapter over a communication link between the information handling system and the power storage adapter. The indication may be provided to a PSA controller within the power storage adapter. In some embodiments, the variable power bus may include power connections for electrically coupling the information handling system and the power storage adapter to each other and a communication link for exchanging information between the information handling system and the power storage adapter. For example, the PSA controller may utilize a universal serial bus (USB) power delivery protocol layer for communicating with and supplying power to the information handling system over the variable power bus through a PSA port and an internal port, each of which is a USB Type-C port. In some embodiments, the PSA controller may include circuitry to establish a power delivery contract to supply electrical power to the power consuming device at the second desired voltage and to configure the power storage adapter to supply electrical power to the information handling system over the variable power bus at the second desired output voltage, as described herein.

Method 500 may, at step 512, include causing electrical power supplied by the power storage adapter over the variable power bus at the second desired output voltage and electrical power supplied by the internal battery at the first desired output voltage to be supplied simultaneously to the information handling system. The sum of the electrical power supplied by the power storage adapter and the electrical power supplied by the internal battery may be greater than or equal to the first power level. For example, causing electrical power supplied by the power storage adapter over the variable power bus at the second desired output voltage and electrical power supplied by the internal battery at the first desired output voltage to be supplied simultaneously to the information handling system, may include the embedded controller circuitry providing a control signal or other indication to the battery management unit that the battery management unit should combine the electrical power supplied by the power storage adapter over the variable power bus at the second desired output voltage and the electrical power supplied by the internal battery at the first desired output voltage. In response, circuitry within the battery management unit may combine the electrical power supplied by the power storage adapter over the variable power bus at the second desired output voltage and the electrical power supplied by the internal battery at the first desired output voltage and supply the combined power to various components within the information handling system.

In some embodiments, if the power storage adapter is not coupled to AC line power, the output of the power storage adapter may correspond to the voltage of the PSA battery ($V_{BAT}$). In such embodiments, it may be necessary for the internal battery voltage (the first desired output voltage) to be equal to the PSA battery voltage ($V_{BAT}$) before the electrical power supplied by the two batteries can be combined and supplied simultaneously to the information handling system. Once the output voltages of the two batteries are equal and the electrical power supplied by the two batteries is combined, the combined electrical power may be supplied to the information handling system in an efficient manner.

In some embodiments, subsequent to combining power from the internal battery and the power storage adapter and supplying the combined power to the information handling system while the information handling system is operating in the first operation mode, the information handling system may begin operating in a second operating mode having different performance and/or power consumption characteristics. For example, when operating in the second operating mode, the information handling system may consume power at a second power level that is less than the first power level. In some embodiments, if either the internal battery or the power storage adapter, individually, has enough power supply capacity to supply electrical power at the second power level, either electrical power supplied by the power storage adapter over the variable power bus alone or electrical power supplied by the internal battery alone may be supplied to the information handling system while the information handling system is operating in the second operating mode.

In some embodiments, when the power storage adapter is not coupled to AC line power, electrical power supplied by the power storage adapter may be sourced from the PSA battery. In some embodiments, and under certain conditions, when the power storage adapter is coupled to AC line power, electrical power supplied by the power storage adapter may be sourced from the AC-DC converter. In other embodiments, or under different conditions, when the power storage adapter is coupled to AC line power, electrical power supplied by the power storage adapter may include power sourced from the PSA battery and power sourced from the AC-DC converter that have been combined by circuitry within the power storage adapter.

Figure 6:
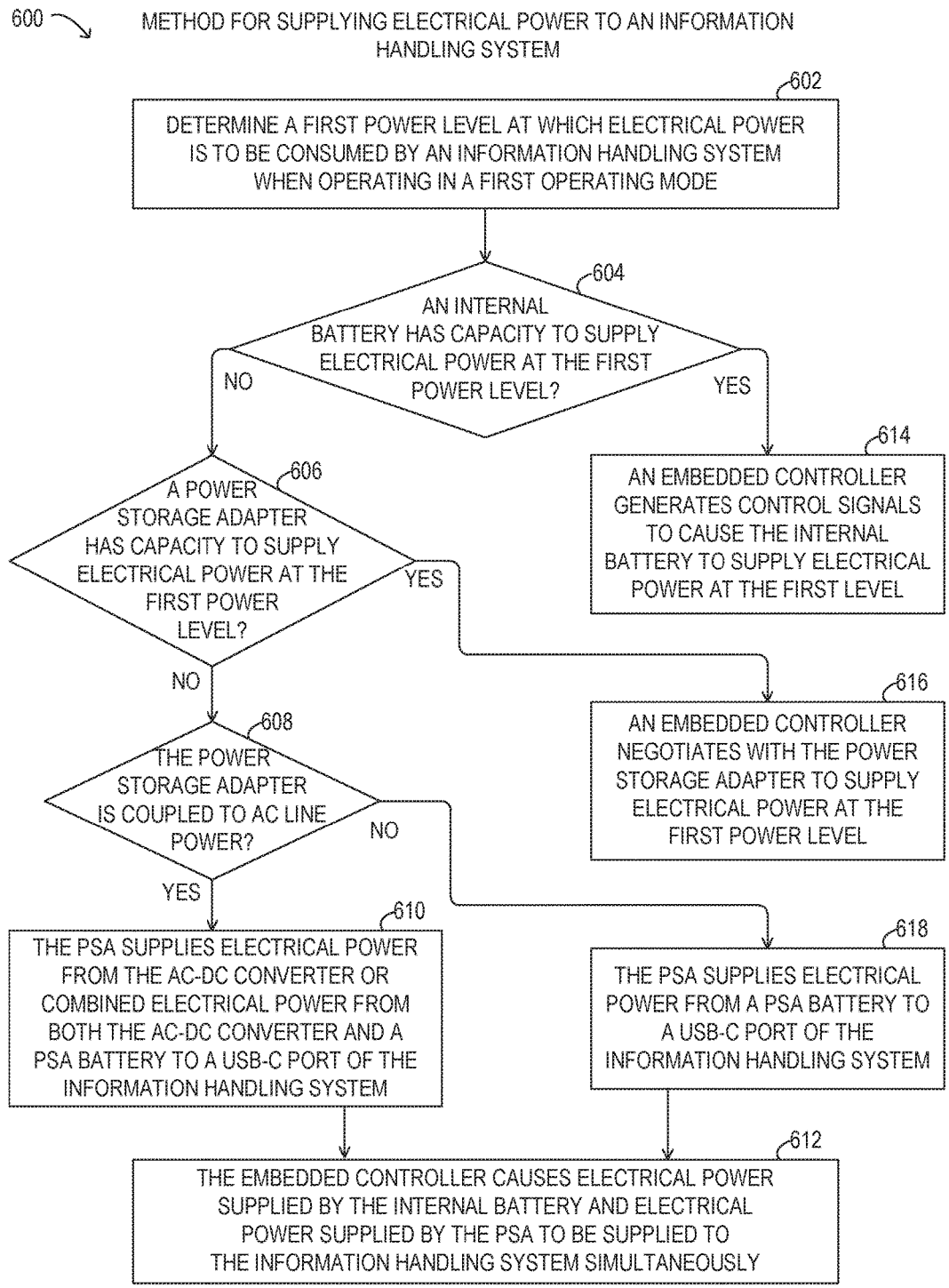
FIG. 6 is a flow chart of selected elements of an embodiment of a method for supplying electrical power to an information handling system.

Referring now to FIG. 6, a flow chart of selected elements of an embodiment of method 600 for supplying electrical power to an information handling system, as described herein, is depicted in flowchart form. Method 600 may be performed using portable information handling system 100, in conjunction with power storage adapter 172 (see FIGS. 1, 2, and 3). In at least some embodiments, method 600 may be performed by EC firmware 186 of embedded controller 180 executing on EC processor 182. In other embodiments, method 600 may be performed by another element of a portable information handling system, such as a hardware state machine or another type of hardware control circuit. It is noted that certain operations described in method 600 may be optional or may be performed in a different order than the order depicted in FIG. 6, in different embodiments.

Method 600 may begin, at step 602, by determining a first power level at which electrical power is to be consumed by an information handling system when operating in a first operating mode. If, at step 604, an internal battery of the information handling system has enough power supply capacity to supply electrical power at the first power level, method 600 may proceed to step 614. Otherwise, method 600 may proceed to step 606. At step 614, method 600 may include the embedded controller generating one or more control signals to cause the internal battery of the information handling system to supply electrical power at the first level.

If, at step 606, an external power storage adapter has enough power supply capacity to supply electrical power at the first power level, method 600 may proceed to step 616. Otherwise, method 600 may proceed to step 608. At step 616, method 600 may include the embedded controller negotiating with the power storage adapter to supply electrical power at the first power level. If, at 608, the power storage adapter is coupled to AC line power, method 600 may proceed to step 610. Otherwise, method 600 may proceed to step 618.

At step 610, method 600 may include the power storage adapter supplying electrical power from the AC-DC converter or the power storage adapter supplying combined electrical power from both the AC-DC converter and a PSA battery to a USB-C port of the information handling system. At step 618, method 600 may include the power storage adapter supplying electrical power from a PSA battery to a USB-C port of the information handling system. At step 612, method 600 may include the embedded controller causing electrical power supplied by the internal battery and electrical power supplied by the power storage adapter to be supplied to the information handling system simultaneously, as described herein.

Note that FIG. 6 illustrates an example embodiment in which it is first determined whether the internal battery is able to supply electrical power at the first power level, and a determination of whether the power storage adapter is able to supply the desired electrical power may be made only if the internal battery is not able to supply the desired electrical power. However, in other embodiments, it may first be determined whether the power storage adapter is able to supply electrical power at the first power level, and a determination of whether the internal battery is able to supply the desired electrical power may be made only if the power storage adapter is not able to supply the desired electrical power.

As disclosed herein, an embedded controller of a portable information handling system may cause electrical power supplied by an external power storage adapter (PSA) and electrical power supplied by an internal battery of the portable information handling system to be combined in order to supply enough electrical power for the information handling system to operate in a particular operating mode. The external power storage adapter may include an AC-DC converter, a separate PSA battery, and intelligent power management functionality. In response to a control signal or other indication from the portable information handling system that the power storage adapter should supply electrical power to the portable information handling system, the power storage adapter may output power sourced from the AC-DC converter, from the PSA battery, or both to a port of the portable information handling system, such as USB Type-C port, over a variable power bus.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
  a variable power bus including power connections for electrically coupling components to each other and a communication link for exchanging information between electrically coupled components;
  a power storage adapter (PSA) including:
    a PSA battery;
    an AC-DC converter; and
    a PSA port for coupling the power storage adapter to the variable power bus;
  an information handling system including:
    an internal battery;
    a battery management unit comprising a DC-DC voltage converter to adjust an output voltage of the internal battery to a desired output voltage;
    an internal port for coupling the information handling system to the power storage adapter over the variable power bus; and
    an embedded controller, wherein the embedded controller comprises circuitry to, when the information handling system is coupled to the power storage adapter over the variable power bus through the internal port:
      determine a first power level at which electrical power is to be consumed by the information handling system when operating in a first operating mode of a plurality of operating modes, each operating mode having respective performance or power consumption characteristics;
      determine that neither the internal battery nor the power storage adapter, individually, has capacity to supply electrical power at the first power level;
      determine a first desired output voltage for the internal battery and a second desired output voltage for the power storage adapter dependent on the first operating mode;
      provide an indication of the first desired output voltage to the battery management unit;
      provide an indication of the second desired output voltage to the power storage adapter over the communication link; and
      cause electrical power supplied by the power storage adapter over the variable power bus at the second desired output voltage and electrical power supplied by the internal battery at the first desired output voltage to be supplied simultaneously to the information handling system, wherein the sum of the electrical power supplied by the power storage adapter and the electrical power supplied by the internal battery is greater than or equal to the first power level.

2. The system of claim 1, wherein:
  to cause electrical power supplied by the power storage adapter over the variable power bus at the second desired output voltage and electrical power supplied by the internal battery at the first desired output voltage to be supplied simultaneously to the information handling system, the embedded controller circuitry is further to provide an indication to the battery management unit to combine the electrical power supplied by the power storage adapter over the variable power bus at the second desired output voltage and the electrical power supplied by the internal battery at the first desired output voltage; and
  the battery management unit further comprises circuitry to combine the electrical power supplied by the power storage adapter over the variable power bus at the second desired output voltage and the electrical power supplied by the internal battery at the first desired output voltage.

3. The system of claim 1, wherein the embedded controller circuitry is further to:
  determine a second power level at which electrical power is to be consumed by the information handling system when operating in a second operating mode of the plurality of operating modes subsequent to operating in the first operating mode;
  determine that the internal battery or the power storage adapter, individually, has capacity to supply electrical power at the second power level;
  cause either electrical power supplied by the power storage adapter over the variable power bus alone or electrical power supplied by the internal battery alone to be supplied to the information handling system when operating in the second operating mode.

4. The system of claim 1, wherein:
  the power storage adapter is not coupled to AC line power; and
  the electrical power supplied by the power storage adapter is sourced from the PSA battery.

5. The system of claim 1, wherein:
  the power storage adapter is coupled to AC line power; and
  the electrical power supplied by the power storage adapter is sourced from the AC-DC converter.

6. The system of claim 1, wherein:
  the power storage adapter is coupled to AC line power; and
  the electrical power supplied by the power storage adapter comprises power sourced from the PSA battery and power sourced from the AC-DC converter.

7. The system of claim 1, wherein the DC-DC voltage converter comprises circuitry to boost an initial output voltage of the internal battery to the first desired output voltage.

8. The system of claim 1, wherein:
  the power storage adapter further comprises a PSA controller;
  the PSA controller utilizes a universal serial bus (USB) power delivery protocol layer for communicating with and supplying power to the information handling system over the variable power bus through the PSA port and the internal port;

the PSA port and the internal port are USB Type-C ports; and the PSA controller circuitry is further to:
establish a power delivery contract to supply electrical power to the information handling system at the second desired voltage; and
configure the power storage adapter to supply electrical power to the information handling system over the variable power bus at the second desired output voltage.

9. The system of claim 1, wherein the embedded controller circuitry comprises:
a processor; and
a memory storing program instructions that when executed by the processor cause the processor to perform:
the determining of the first power level;
the determining that neither the internal battery nor the power storage adapter, individually, has capacity to supply electrical power at the first power level;
the determining of the first desired output voltage and the second desired output voltage;
the providing of the indication of the first desired output voltage to the battery management unit;
the providing of the indication of the second desired output voltage to the power storage adapter over the communication link; and
the causing of the electrical power supplied by the power storage adapter and the electrical power supplied by the internal battery to be supplied simultaneously to the information handling system.

10. A method for supplying electrical power to an information handling system, comprising:
determining a first power level at which electrical power is to be consumed by the information handling system when operating in a first operating mode of a plurality of operating modes, each operating mode having respective performance or power consumption characteristics;
determining that neither an internal battery of the information handling system nor a power storage adapter (PSA), comprising a PSA battery and an AC-DC converter, to which the information handling system is coupled over a variable power bus, individually, has capacity to supply electrical power at the first power level;
determining a first desired output voltage for the internal battery and a second desired output voltage for the power storage adapter dependent on the first operating mode;
providing an indication of the first desired output voltage to a battery management unit comprising a DC-DC voltage converter for adjusting an output voltage of the internal battery to a desired output voltage;
providing an indication of the second desired output voltage to the power storage adapter over a communication link between the information handling system and the power storage adapter; and
causing electrical power supplied by the power storage adapter over the variable power bus at the second desired output voltage and electrical power supplied by the internal battery at the first desired output voltage to be supplied simultaneously to the information handling system, wherein the sum of the electrical power supplied by the power storage adapter and the electrical power supplied by the internal battery is greater than or equal to the first power level.

11. The method of claim 10, wherein:
causing electrical power supplied by the power storage adapter over the variable power bus at the second desired output voltage and electrical power supplied by the internal battery at the first desired output voltage to be supplied simultaneously to the information handling system comprises providing an indication to the battery management unit to combine the electrical power supplied by the power storage adapter over the variable power bus at the second desired output voltage and the electrical power supplied by the internal battery at the first desired output voltage; and
the method further includes the battery management unit combining the electrical power supplied by the power storage adapter over the variable power bus at the second desired output voltage and the electrical power supplied by the internal battery at the first desired output voltage.

12. The method of claim 10, further comprising:
determining a second power level at which electrical power is to be consumed by the information handling system when operating in a second operating mode of the plurality of operating modes subsequent to operating in the first operating mode;
determining that the internal battery or the power storage adapter, individually, has capacity to supply electrical power at the second power level;
causing either electrical power supplied by the power storage adapter over the variable power bus alone or electrical power supplied by the internal battery alone to be supplied to the information handling system when operating in the second operating mode.

13. The method of claim 10, wherein:
the power storage adapter is not coupled to AC line power; and
the electrical power supplied by the power storage adapter is sourced from the PSA battery.

14. The method of claim 10, wherein:
the power storage adapter is coupled to AC line power; and
the electrical power supplied by the power storage adapter is sourced from:
the AC-DC converter; or
both the PSA battery and the AC-DC converter.

15. The method of claim 10, further comprising:
the DC-DC voltage converter boosting an initial output voltage of the internal battery to the first desired output voltage.

16. The method of claim 10, further comprising:
determining that the information handling system is operating in the first operating mode, wherein determining that the information handling system is operating in the first operating mode comprises:
monitoring a power draw of the information handling system;
receiving an indication of a request to enter the first operating mode; or
receiving a request for power to be supplied at the first power level.

17. An information handling system including, comprising:
an internal battery;

a battery management unit comprising a DC-DC voltage converter to adjust an output voltage of the internal battery to a desired output voltage;

an internal port for coupling the information handling system to a power storage adapter (PSA) over a variable power bus, the variable power bus including power connections for electrically coupling components to each other and a communication link for exchanging information between electrically coupled components, and the power storage adapter including a PSA battery and an AC-DC converter to supply electrical power to the information handling system over the variable power bus; and an embedded controller, wherein the embedded controller comprises circuitry to, when the information handling system is coupled to the power storage adapter over the variable power bus through the internal port:

determine a first power level at which electrical power is to be consumed by the information handling system when operating in a first operating mode of a plurality of operating modes, each operating mode having respective performance or power consumption characteristics;

determine that neither the internal battery nor the power storage adapter, individually, has capacity to supply electrical power at the first power level;

determine a first desired output voltage for the internal battery and a second desired output voltage for the power storage adapter dependent on the first operating mode;

provide an indication of the first desired output voltage to the battery management unit;

provide an indication of the second desired output voltage to the power storage adapter over the communication link; and cause electrical power supplied by the power storage adapter over the variable power bus at the second desired output voltage and electrical power supplied by the internal battery at the first desired output voltage to be supplied simultaneously to the information handling system, wherein the sum of the electrical power supplied by the power storage adapter and the electrical power supplied by the internal battery is greater than or equal to the first power level.

18. The information handling system of claim 17, wherein:

to cause electrical power supplied by the power storage adapter over the variable power bus at the second desired output voltage and electrical power supplied by the internal battery at the first desired output voltage to be supplied simultaneously to the information handling system, the embedded controller circuitry is further to provide an indication to the battery management unit to combine the electrical power supplied by the power storage adapter over the variable power bus at the second desired output voltage and the electrical power supplied by the internal battery at the first desired output voltage; and the battery management unit further comprises circuitry to combine the electrical power supplied by the power storage adapter over the variable power bus at the second desired output voltage and the electrical power supplied by the internal battery at the first desired output voltage.

19. The information handling system of claim 17, wherein the embedded controller circuitry is further to:

determine a second power level at which electrical power is to be consumed by the information handling system when operating in a second operating mode of the plurality of operating modes subsequent to operating in the first operating mode;

determine that the internal battery or the power storage adapter, individually, has capacity to supply electrical power at the second power level;

cause either electrical power supplied by the power storage adapter over the variable power bus alone or electrical power supplied by the internal battery alone to be supplied to the information handling system when operating in the second operating mode.

20. The information handling system of claim 17, wherein the DC-DC voltage converter comprises circuitry to boost an initial output voltage of the internal battery to the first desired output voltage.

* * * * *